(12) United States Patent
Whitman et al.

(10) Patent No.: US 10,896,689 B2
(45) Date of Patent: Jan. 19, 2021

(54) VOICE TONAL CONTROL SYSTEM TO CHANGE PERCEIVED COGNITIVE STATE

(71) Applicant: INTERNATIONAL BUSINESS MACHINES CORPORATION, Armonk, NY (US)

(72) Inventors: Todd R. Whitman, Bethany, CT (US); Aaron K. Baughman, Silver Spring, MD (US); David Bastian, Dupage, IL (US); Nik McCrory, Sacramento, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/047,728

(22) Filed: Jul. 27, 2018

(65) Prior Publication Data
US 2020/0035260 A1    Jan. 30, 2020

(51) Int. Cl.
| | |
|---|---|
| *G10L 25/63* | (2013.01) |
| *G10L 21/10* | (2013.01) |
| *G10L 15/18* | (2013.01) |
| *G06F 40/42* | (2020.01) |
| *H04M 3/42* | (2006.01) |

(52) U.S. Cl.
CPC .............. *G10L 25/63* (2013.01); *G06F 40/42* (2020.01); *G10L 15/18* (2013.01); *G10L 21/10* (2013.01); *H04M 3/42* (2013.01)

(58) Field of Classification Search
CPC ......... G10L 25/63; G10L 15/18; G10L 21/10; G06F 17/2809; H04M 3/42
USPC .......................................................... 704/257
See application file for complete search history.

(56) References Cited

U.S. PATENT DOCUMENTS

| | | | |
|---|---|---|---|
| 8,326,624 B2 | 12/2012 | Jaiswal | |
| 8,380,794 B2 | 2/2013 | Chakra et al. | |
| 9,300,790 B2 | 3/2016 | Gainsboro et al. | |
| 2007/0038452 A1 | 2/2007 | Blair et al. | |
| 2007/0071206 A1* | 3/2007 | Gainsboro | G10L 25/63 379/168 |
| 2014/0114663 A1 | 4/2014 | Lin et al. | |

(Continued)

FOREIGN PATENT DOCUMENTS

CN          101661675          3/2010

OTHER PUBLICATIONS

H. W. Lie, P. E. Dybvik and J. Rygh, "SCREAM: screen-based navigation in voice messages," Proceedings 1993 IEEE Symposium on Visual Languages, Bergen, Norway, 1993, pp. 401-405, doi: 10.1109/VL.1993.269551. (Year: 1993).*

*Primary Examiner* — Bharatkumar S Shah
(74) *Attorney, Agent, or Firm* — Robert Shatto; Andrew D. Wright; Roberts Calderon Safran & Cole, P.C.

(57) ABSTRACT

A voice tonal control system is provided to achieve a target perceived cognitive state of a user's voice. For this purpose a computer-implemented method includes receiving, by a computer device, user input defining a target perceived cognitive state of a user's voice, determining, by the computer device, an actual perceived cognitive state of the user's voice based on cognitively analyzing a spoken sample of the user's voice, and providing, by the computer device, an alert in real time to the user based on the actual perceived cognitive state of the user's voice differing from the target perceived cognitive state of the user's voice.

20 Claims, 3 Drawing Sheets

(56) References Cited

U.S. PATENT DOCUMENTS

| | | | |
|---|---|---|---|
| 2014/0118225 A1* | 5/2014 | Jerauld | A61B 5/7278 345/8 |
| 2014/0280296 A1* | 9/2014 | Johnston | G06F 9/453 707/769 |
| 2019/0095775 A1* | 3/2019 | Lembersky | G06N 3/008 |

* cited by examiner

VOICE TONAL CONTROL SYSTEM TO CHANGE PERCEIVED COGNITIVE STATE

BACKGROUND

The present invention generally relates to achieving a target perceived cognitive state of a user's voice, and, more particularly, to providing an alert to a user when an actual perceived cognitive state of the user's voice differs from a target perceived cognitive state of the user's voice, and making recommendations to the user to select tonal and/or vocabulary changes to achieve the target perceived cognitive state of the user's voice.

In the course of speaking, a person's cognitive state is often reflected in their spoken words, for example, in inflections, volume and speed of speech. Also, the vocabulary which the speaker uses reflects their cognitive state. As such, a listener can often perceive the speaker's cognitive (i.e., emotional) state by simply listening. On the other hand, in certain situations, such as speaking in public or on a telephone or computer microphone, people often become nervous or excited, and these emotions can overshadow the cognitive state which the speaker would prefer to convey to the listener.

Cognitive analysis, using computer cognitive software, can analyze a spoken message to determine a person's cognitive state from an analysis of factors such as inflections, volume, speed and vocabulary. For performing the analysis, these factors of speech are determined and compared with a database so that the factors of speech can be used to determine the cognitive state of the speaker, such as nervousness, empathy, strength, enthusiasm, excitement, sadness, anger, happiness, irritation, pacification, and enticement.

Recently, the use of robots, with robotic voices, has become popular. In particular, robots are becoming more frequently used in situations where a human user asks the robot a question, which the robot response to using a robotic voice which simulates a human voice.

SUMMARY

In a first aspect of the invention, there is a computer-implemented method for receiving, by a computer device, user input defining a target perceived cognitive state of a user's voice, determining, by the computer device, an actual perceived cognitive state of the user's voice based on cognitively analyzing a spoken sample of the user's voice, and providing, by the computer device, an alert in real time to the user based on the actual perceived cognitive state of the user's voice differing from the target perceived cognitive state of the user's voice.

In another aspect of the invention, there is a computer program product including a computer readable storage medium having program instructions embodied therewith, the program instructions executable by a computing device to cause the computing device to receive user input defining a target perceived cognitive state of a user's voice, to determine an actual perceived cognitive state of the user's voice based on cognitively analyzing a spoken sample of the user's voice, to select a tonal change to achieve the target perceived cognitive state of the user's voice based on the actual perceived cognitive state of the user's voice differing from the target perceived cognitive state of the user's voice, and to recommend the selected tonal change to the user.

In another aspect of the invention, there is system including a processor, a computer readable memory, a computer readable storage medium, and program instructions to receive user input defining a target perceived cognitive state of a user's voice, program instructions to determine an actual perceived cognitive state of the user's voice based on cognitively analyzing a spoken sample of the user's voice, and program instructions to provide an alert in real time to the user based on the actual perceived cognitive state of the user's voice differing from the target perceived cognitive state of the user's voice, wherein the program instructions are stored on the computer readable storage medium for execution by the processor via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
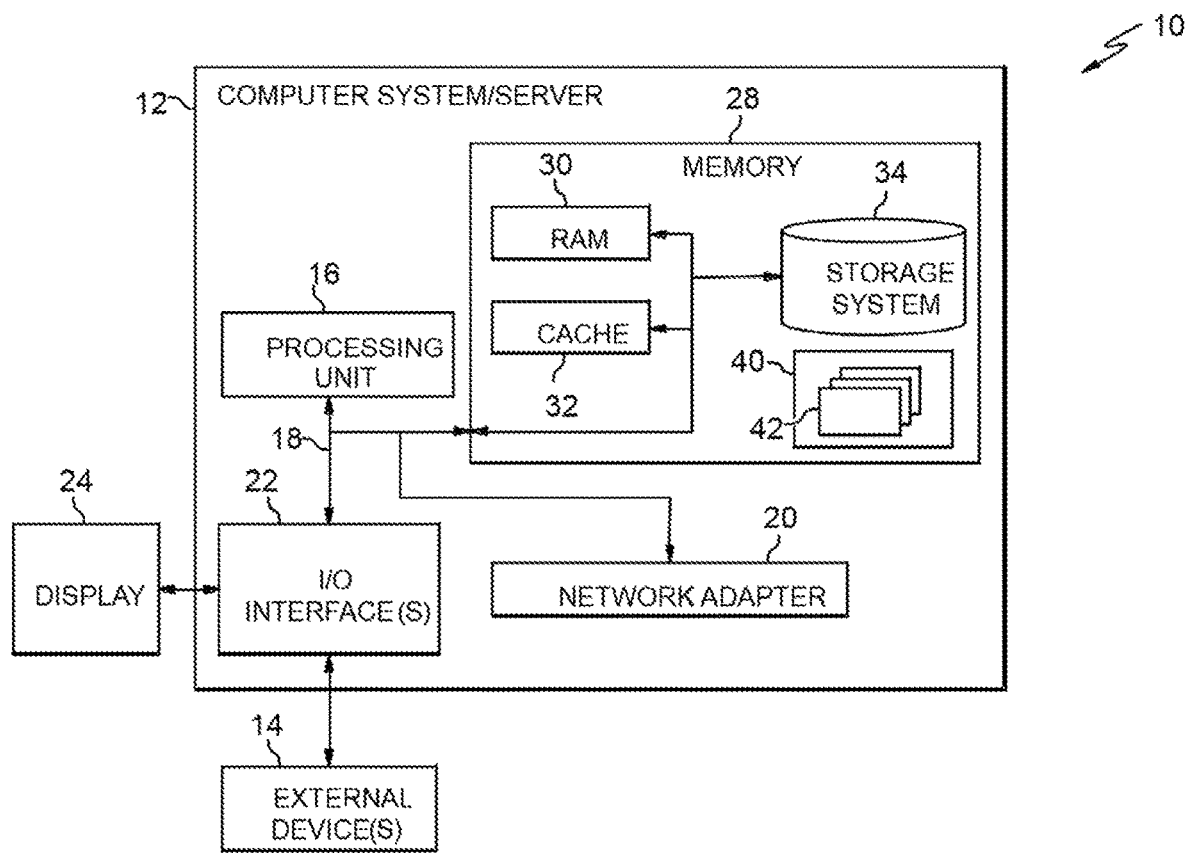
FIG. 1 depicts a computing infrastructure in accordance with aspects of the invention.

The present invention generally relates to achieving a target perceived cognitive state of a user's voice, and, more particularly, to providing an alert to a user when an actual perceived cognitive state of the user's voice differs from a target perceived cognitive state of the user's voice, and making recommendations to the user to select tonal and/or vocabulary changes to achieve the target perceived cognitive state of the user's voice. When speaking into a microphone, it is sometimes difficult for a user to be able to accurately gauge how their tone is being perceived by other people. This is true whether one is speaking to an audience through a microphone, or speaking remotely, for example, via a mobile device or a computing device. Further, it is desirable for a user to be able to control the mood or the tone of their voice within during a conversation. In addition, it is desirable to provide a real-time interpretation of speech content and tone to alert a user as to how they are being perceived by a listener, so that the user can make an informed decision with regard to continuing or altering their current content/tone of speech. Also, in certain circumstances, the perceived cognitive state imparted by robotic voices is inappropriate for the content of the imparted information, and, in such circumstances, it is desirable to be able to change the perceived cognitive state imparted by such robotic voices.

Aspects of the present invention include allowing a user to visually monitor the emotional tone of their speech in real time. For example, by watching a trend line move (e.g., by a bar indication arrangement), the user will be able to adjust their tone, volume, speed and/or vocabulary to achieve a desired perceived cognitive state while speaking. In other words, by using real-time machine interpretation of speech content and tone, using cognitive analysis, the user is alerted as to how they could be perceived by another user (e.g., listener) so that they can make an informed decision to continue or alter their present content/tone of speech. The user alerts can be haptic, visual or audio, for example.

In accordance with aspects of the present invention, a computing device can automatically change the user's perceived cognitive state by altering the user's voice by voice modification or voice synthesis. In embodiments, speakers can create training data for speech to create user models that permit fine-tuning a speech prior to giving it. This enables providing a computing training phase for speakers to practice to produce training that includes speech and adjust tonal quality and word phrasing to adjust the speech to achieve a desired tone, or desired tones at different times in the speech.

In accordance with aspects of the invention, a system is provided which allows a user to receive real-time feedback with regards to the perceived tone of their speech. This allows the user to use this feedback to adjust the volume, inflection, speed or vocabulary they are using to adjust their perceived tone to a tone which they would prefer to project. To this end, the user can set a predetermined tone (e.g., empathy, strength, enthusiasm, excitement, sadness, anger, happiness, irritation, pacification, and enticement) which they wish to convey, and then adjust their speech in real time to the desired tone by watching a visual representation of the tone the system is registering from the user.

Alternatively, the system could be used on a mobile device with haptic feedback or audio feedback to notify the user when the tone they are projecting is outside the desired tone that they have preset. The system could also be used prior to giving a speech to allow the user to practice the speech while adjusting to the desired tone.

In accordance with aspects of the invention, the user first inputs a desired perceived cognitive state (i.e., tone) for their speech. The user then speaks into a microphone which serves as an input to the system. The system then performs cognitive analysis of the user speech to determine the actual perceived tone of the speaker. Based on this cognitive analysis, the user is alerted as to differences between the actual perceived tone of their speech and their desired tone so that they can make suitable adjustments, for example, in terms of inflection, speed, volume and/or vocabulary. Alternatively, or in addition, the system can modify the user's voice, or synthesize the user's voice, to produce the desired perceived tone.

Aspects of the invention provide a technical solution to the problem of a person not being able to accurately gauge how their tone is being perceived by other people. In embodiments, the technical solution includes using computer-based cognitive analysis and classification to determine a cognitive state of a user's speech, comparing the determined cognitive state to a target cognitive state, and providing visual, audible, or haptic feedback to the user based on the determining. Aspects of the invention are implemented using devices and techniques that are necessarily rooted in computer technology, such as computer-based cognitive analysis and classification, and that have no pre-computer analogue. Aspects of the invention may also be implemented with a particular machine, such as a voice synthesizer/modifier and speaker.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, a schematic of an example of a computing infrastructure 10 is shown. Computing infrastructure 10 is only one example of a suitable computing infrastructure and is not intended to suggest any limitation as to the scope of use or functionality of embodiments of the invention described herein. Regardless, computing infrastructure 10 is capable of being implemented and/or performing any of the functionality set forth hereinabove.

In computing infrastructure 10 there is a computer system (or server) 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computing infrastructure 10 is shown in the form of a general-purpose computing device. The components of computer system 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
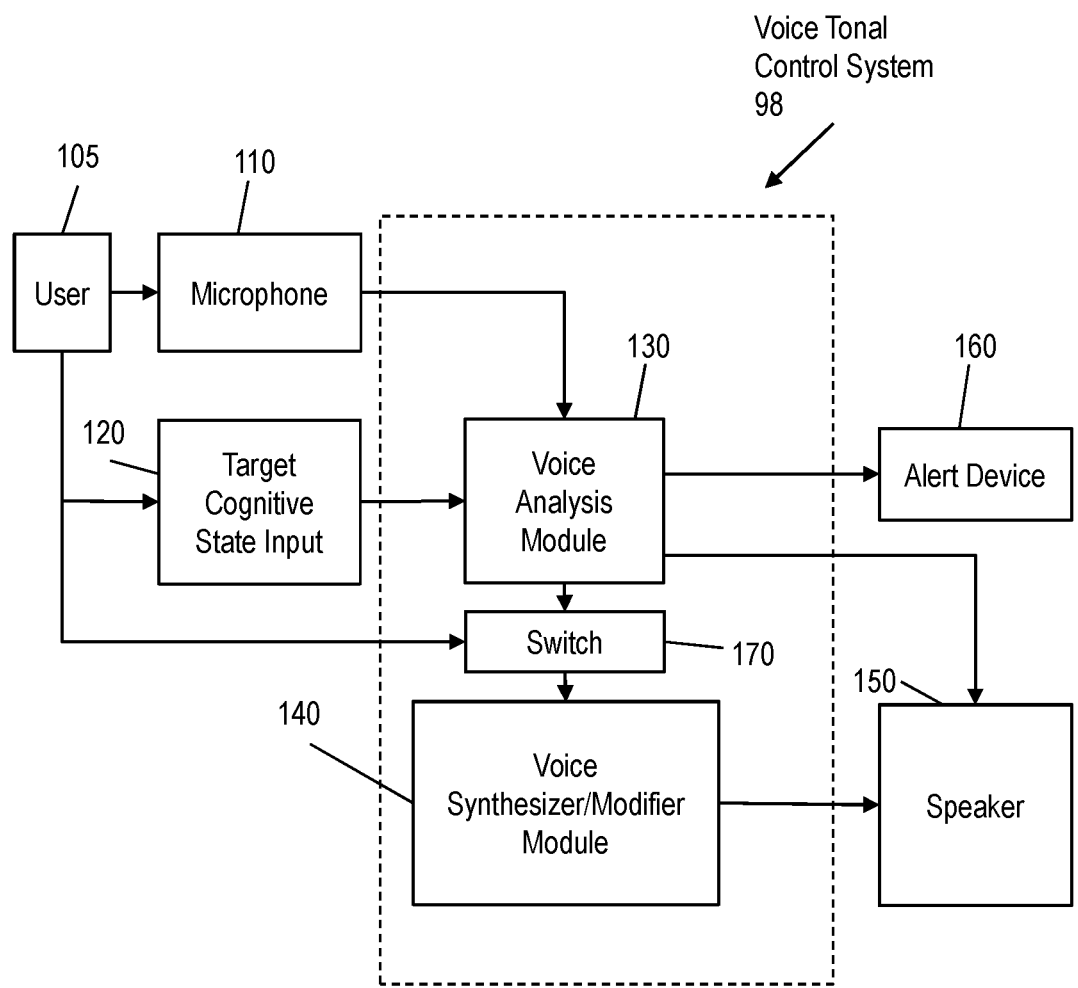
FIG. 2 shows a block diagram of an exemplary environment in accordance with aspects of the invention.

FIG. 2 shows a block diagram of an exemplary environment in accordance with aspects of the invention. In embodiments, the environment includes a vocal tonal control system 98 that includes a voice analysis module 130 and a voice synthesizer/modifier module 140, with a switch 170 interposed there between. The vocal tonal control system 98 may be coupled to a microphone 110, a target cognitive state input 120 (i.e., an input device, such as a keyboard or a voice-activated input), a speaker 150, and an alert device 160 as described herein.

It is noted that the elements shown in FIG. 2 can all be provided in a single device, such as a mobile device, a tablet device or other computing device. As an example, the voice tonal control system 98 could be incorporated in a mobile phone which includes a microphone, and input arrangement, an alert device and a speaker. Alternatively, the target cognitive state input 120, the voice analysis module 130, the switch 170, the voice synthesizer/modifier module 140 and the alert device 160 can be a combined into a single device interposed between the microphone 110 in the speaker 150. In yet another example, as shown in FIG. 2, the voice analysis module 130, the switch 170 and the voice synthesizer/modifier module 140 of the voice tonal control system 98 can be combined into a single device connected to the microphone 110, the target cognitive state input 120, the alert device 160 and the speaker 150.

With continued reference to FIG. 2, the voice tonal control system 98 comprises a computer system that may include one or more elements of the computer system 12 of FIG. 1. In accordance with aspects of the invention, the voice tonal control system 98 includes the voice analysis module 130 and the voice synthesizer/modifier module 140, each of which may comprise one or more program modules such as program modules 42 of FIG. 1. Aspects of the invention are not limited to the exact number of modules shown in FIG. 2, and fewer modules may be used by combining the functionality of one or more modules into another module. Conversely, more modules may be employed by splitting the functionality of one or more of the modules shown into plural different modules.

The embodiment shown in FIG. 2 is configured to operate in response to a voice input from a user 105 into the microphone 110. In embodiments, the user 105 can be a person or, alternatively, a robotic user capable of simulating a human voice. The microphone 110 can be separate from the other elements, or can be a microphone in a computing device, such as a user smart phone, tablet computer, smart watch, etc., that includes one or more microphones to receive speech input from a human or robotic user.

In embodiments, the target cognitive state input 120 is a device by which the user 105 provides user input to define a target cognitive state which the user 105 desires to convey to a listener. In embodiments, the target cognitive state input 120 can be any input device appropriate for inputting an indication of a desired cognitive state which the user 105 wishes to achieve. For example, the target cognitive state input 120 can be a keyboard, or a voice command input arrangement using a microphone, for example. Examples of target cognitive states provided by the target cognitive state input 120 can include, but are not limited to, empathy, strength, enthusiasm, excitement, sadness, anger, happiness, irritation, pacification, and enticement.

In embodiments, the voice analysis module 130 determines actual perceived cognitive states of the user's voice, for example, how the use's voice is likely to be perceived by listeners. This analysis is performed using cognitive computing software and techniques to compare factors of the spoken sample of the message spoken by the user 105 into the microphone 110, such as inflection, speed, volume and vocabulary, to a database to correlate these factors with cognitive states (e.g., emotions) which are likely to be perceived by a listener based on the analyzed factors. In particular, the database may store data obtained from previous studies of typical listener perception of the cognitive state of a speaker to messages including various characteristics of inflection, speed, volume and vocabulary. In embodiments, the voice analysis module 130 determines the actual perceived cognitive state of the speech received at the microphone 110 in part by comparing quantifiable parameters of the speech received at the microphone 110 to the data in the database. In embodiments, the actual perceived cognitive state is constrained to be one of a set of possible states (e.g., empathy, strength, enthusiasm, excitement, sadness, anger, happiness, irritation, pacification, and enticement) that is identical to a set of states that a user may input as the desired state via the target cognitive state input 120.

In accordance with aspects of the invention, based on determining the actual perceived cognitive state of the speech received at the microphone 110, the voice analysis module 130 then determines whether the actual perceived cognitive state differs from the target perceived cognitive state input at the target cognitive state input 120. For example, the user 105 may provide input at the target cognitive state input 120 to define the target state as enthusiasm, and the voice analysis module 130 may determine that the actual perceived cognitive state of the speech received at the microphone 110 is nervousness. In this example, the voice analysis module 130 determines that the target state (e.g., enthusiasm) does not match the actual state (e.g., nervousness).

In accordance with aspects of the invention, when it is determined by the voice analysis module 130 that the actual perceived cognitive state of the user's voice input from the microphone 110 differs from the target cognitive state which the user 105 entered into the target of cognitive state input 120, the voice analysis module 130 makes recommendations regarding tonal and/or vocabulary changes to recommend to the user 105. In embodiments, these recommendations for tonal changes (such as inflection, speed and volume) and vocabulary changes are made by noting the differences between the tonal features (e.g., infection, speed and volume) and vocabulary spoken into the microphone 110 by the user 105 and tonal features and vocabulary which is stored in the database as appropriate for the target cognitive state input from the target cognitive state input 120, and recommending changes which will match the tonal features in the vocabulary of the user 105 with tonal features and vocabulary correlated with the target cognitive state. This will assist the user 105 in achieving the target perceived cognitive state that they have input using the target cognitive state input 120.

In embodiments, the voice analysis module 130 makes the recommendations to the user 105 controlling the alert device 160 to provide feedback to the user 105. The alert device 160 provides a visual alert, and audio alert or a haptic alert, or some combination of these alerts, based upon a determination by the voice analysis module 130 that the actual perceived cognitive state of the user's voice received from the microphone 110 differs from the target cognitive state received from the target cognitive state input 120. In embodiments, the alerts provided by the alert device 160 are visual, audible or haptic alerts indicating that the actual perceived cognitive state of the user's voice differs from the target of cognitive state. In other embodiments, the alert device 160 provides not only an alert regarding these differences, but also recommendations as to how changes can be made to match the actual perceived cognitive state of the user's voice to the target perceived cognitive state.

For example, in embodiments the alert device 160 is a display screen which provides a visual message with text suggestions as a recommendation for changing factors of the user speech, for example, inflection, speed, volume and/or vocabulary. In embodiments, the display is color-coded so that a large deviation between the actual perceived cognitive state determined by the voice analysis module 130 and the target perceived cognitive state input by the target cognitive state input 120 is indicated, for example, in red, whereas a slight deviation is indicated in a milder color, such as yellow. In alternative embodiments, the visual message is provided as a number of bars. For example, four bars indicates a large deviation, whereas one or two bars indicates a slight deviation. The bars could also be color-coded to attract the user's attention in the case of large deviations. In still further embodiments, are used to provide an indication to the user of deviations of the actual perceived cognitive state from the target perceived cognitive state.

In alternative embodiments, the alert device 160 provides an audio message as a recommendation to match the actual perceived cognitive state with the target perceived cognitive state. In embodiments, the alert device 160 comprises earplugs that the user is wearing, and the audio message is emitted by the earplugs in alternative embodiments, instead of an audio message, and audible alert is provided in the form of beeps or tones which are indicative of the degree of deviation between the actual perceived cognitive state and the target perceived cognitive state. For example, four beeps indicates a large degree of deviation, whereas one or two beeps indicate only minor variations.

As another alternative, the alert device 160 is a haptic device to provide an alert that the voice analysis module 130 has determined that the actual perceived cognitive state differs from the target perceived cognitive state. In embodiments, the haptic alert is a vibrating alert device which vibrates at a rate of vibration which increases as the difference increases between the actual perceived cognitive state of the user's voice and the target perceived cognitive state of the user's voice.

It is noted that in all instances, whether the alert and/or recommendation is visual, audible, or haptic, the alert/recommendation is provided in real time by the alert device 160 to the user 105. This is advantageous in that, after an initial spoken sample of a spoken message by the user 105 is analyzed by the voice analysis module 130, a real-time alert/recommendation is provided by the alert device 160 so that the user 105 can modify subsequent portions of the spoken message.

In accordance with aspects of the invention, as shown in FIG. 2, after passing through the voice analysis module 130, the voice data received at the microphone 110 can be passed directly to the speaker 150 without modification. In this case, the user's voice is not modified, but, as noted above, the alert device 160 can provide recommendations for tonal and/or vocabulary changes to change the actual perceived cognitive state of the user's voice.

Alternatively, as shown in FIG. 2, the voice data received at the microphone 110 can be output from the voice analysis module 130 to a voice synthesizer/modifier module 140. For this purpose, a switch 170 is provided to allow the user 105 to decide whether to pass their voice directly to the speaker 150 or to route it through the voice synthesizer/modifier module 140 prior to providing the user's voice to the speaker 150.

In embodiments, the voice synthesizer/modifier module 140 receives recommendations from the voice analysis module 130 to make modifications to the user's voice from the microphone 110 in order to adjust, in real time, the inflection, volume and speed of the user's voice to achieve, or at least move closer to, the target cognitive state which the user 105 wishes to present to the listener for remaining portions of the spoken message. In alternative embodiments, the voice synthesizer/modulator module 140 synthesizes a new voice, in real time, which provides the desired target cognitive state which the speaker wishes to present for remaining portions of the spoken message. This voice synthesis is structured using characteristics of the user's voice, such as accent, frequency range, vibrato, tone, inflection etc. so that the synthesized voice sounds close to the user's actual voice. In any event, after either voice modification or voice synthesis, the output of the voice synthesizer/modifier module 140 is provided to the speaker 150. The speaker 150 may be any conventional loudspeaker arrangement, including those provided in mobile devices, tablet devices, computers, telephone systems and sound systems used for audience presentations.

It is also noted that, in addition to estimates of actual perceived cognitive states determined by cognitive analysis using the voice analysis module 130, cameras (not shown) can be used to perform conventional facial recognition techniques to determine actual perceived cognitive states by listeners of the user's voice. Such camera data can be provided to the voice analysis module 130 to assist in the determination as to whether the actual perceived cognitive state differs from the target perceived cognitive state which is provided to the voice analysis module 130 by the target cognitive state input 120.

Figure 3:
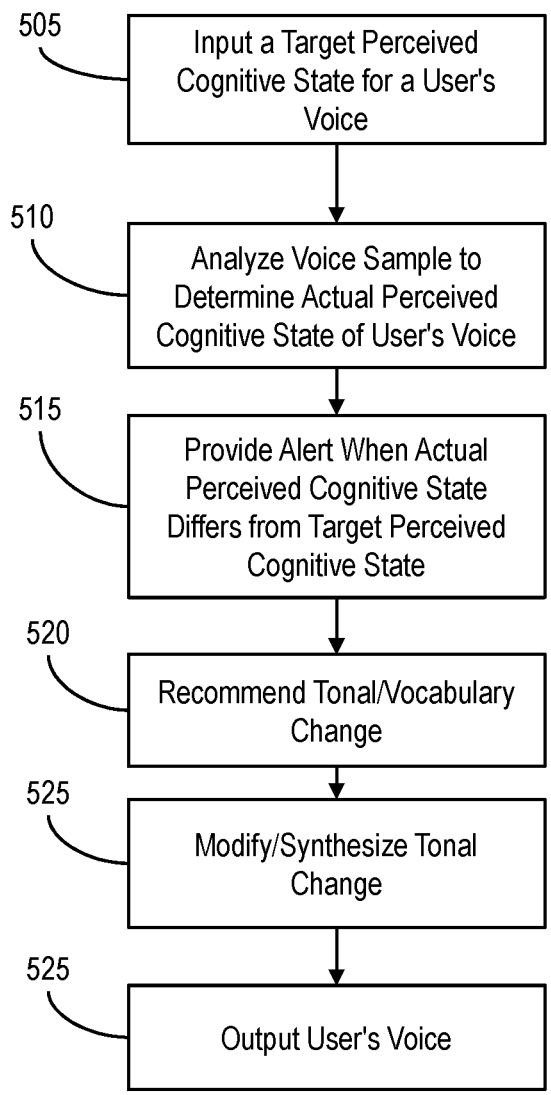
FIG. 3 shows a flowchart of an exemplary method in accordance with aspects of the invention.

FIG. 3 shows a flowchart of a method in accordance with aspects of the present invention, utilizing the exemplary embodiment shown in FIG. 2. The steps of the method may be performed in the environment of FIG. 2 and are described with reference to the elements and steps described with respect to FIGS. 1 and 2.

At step 505, the user 105 operates the target cognitive state input 120 (e.g., via a keyboard or voice activated command device comprising the target cognitive state input 120) to input a target perceived cognitive state for a user's voice into the voice analysis module 130 of FIG. 2. For example, as noted above, the target cognitive states which a user 105 might wish to impart to a listener could include, for example: empathy; strength; enthusiasm; excitement; sadness; anger; happiness; irritation; pacification; and enticement.

At step 510, the voice analysis module 130 analyzes a voice sample provided by the user 105 into the microphone 110 as part of a spoken message of the user. In embodiments, and as described with respect to FIG. 2, the voice analysis module 130 at step 510 determines an actual perceived cognitive state of the user's voice using cognitive analysis techniques including comparing factors in the user's voice, such as inflection, speed, volume and vocabulary, to a database which correlates these factors with actual perceived cognitive states which a listener is likely to perceive from the analyzed factors.

At step 515, the voice analysis module 130 provides an alert, via the alert device 160, to the user 105 when the actual perceived cognitive state determined by the voice analysis module 130 differs from the target perceived cognitive state set by the user 105 into the voice analysis module 130 by the target cognitive state input 120. In embodiments, and as described with respect to FIG. 2, the alert may be one or more of visual, audible, and haptic.

At step 520, the voice analysis module 130 recommends, via the alert device 160, tonal and/or vocabulary changes to the user 105 to assist the user 105 in achieving the desired target perceived cognitive state. For example, as described above with regard to FIG. 2, these recommendations can be presented visually, for example, with the display device, and/or audibly, for example, through earphones, and/or have haptically, for example, through a vibrating mobile device.

Optionally at step 525, the voice synthesizer/modifier module 140 modifies or synthesizes tonal changes. In embodiments, and as described with respect to FIG. 2, these tonal changes can be changes in inflection, speed and volume of the speaker's voice to achieve the desired target perceived cognitive state to a listener.

At step 530, the speaker 150 outputs the user's voice to a listener. If the user's voice is provided directly from the output of the voice analysis module 130 to the speaker 150, no modifications will be made to the user's voice. However, by responding to the information provided by the alert device 160, that is, recommendations for tonal and/or vocabulary changes from the voice analysis module 130, the user can change the tone (inflection, speed and/or/volume) and vocabulary of in real time for the remaining portions of the spoken message following the spoken sample from the spoken message analyzed by the voice analysis module 130.

Alternatively, if the switch 170 has been set by the user 105 to pass the output of the voice analysis module 130 to the voice synthesizer/modifier module 140, then at step 530 modifications to the user's voice, or replacement of the user's voice with a synthesized voice, are output from the speaker 150.

As also discussed above, the user 105 can be a person or, alternatively, a robot. In the latter case, the voice tonal control system 98 can modify the robotic voice to provide a perceived cognitive state which was appropriate for given situations. For example, a human user can provide a target cognitive state input through element 120 to set a desired cognitive state for listeners to perceive via the speaker 154 for the voice of a robotic user 105, using the principles discussed above regarding the operation of the voice tonal control system 98.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
receiving, by a computer device, user input defining a target perceived cognitive state of a user's voice;
determining, by the computer device, an actual perceived cognitive state of the user's voice based on cognitively analyzing a spoken sample of the user's voice;
providing, by the computer device, an alert in real time to the user based on the actual perceived cognitive state of the user's voice differing from the target perceived cognitive state of the user's voice;
outputting a recommendation to the user to achieve the targeted perceived cognitive state, wherein the outputting the recommendation is performed based on determining the actual perceived cognitive state of the user's voice differs from the target perceived cognitive state of the user's voice, and wherein the recommendation comprises a recommended tonal change of the user's voice and a recommended vocabulary change of the user's voice; and
displaying, by the computer device, a color coded visual message to the user to adjust a tone of the user's voice, a volume of the user's voice, a speed of the user's voice and a vocabulary of the user's voice to achieve the targeted perceived cognitive state while speaking, wherein a color of the color coded visual message represents an amount of deviation from the target perceived cognitive state of the user's voice.

2. The method of claim 1, further comprising:
generating, by the computer device, a modified voice by modifying the tone of the user's voice to match the actual perceived cognitive state of the user's voice to the target perceived cognitive state of the user's voice; and outputting the modified voice via a speaker device.

3. The method of claim 2, wherein modifying the tone includes at least one selected from a group consisting of: changing the volume of the user's voice; changing an inflection of the user's voice; and changing the speed of the user's voice.

4. The method of claim 1, wherein the alert is at least one selected from the group consisting of: a visual alert; an audio alert; and a haptic alert.

5. The method of claim 4, wherein the visual alert includes at least one selected from the group consisting of: a color display; and emojis.

6. The method of claim 4, wherein the visual alert includes text messages recommending to the user at least one selected from the group consisting of: a predetermined tonal change to match the actual perceived cognitive state of the user's voice to the target perceived cognitive state of the user's voice; and a predetermined vocabulary change to match the actual perceived cognitive state of the user's voice to the target perceived cognitive state of the user's voice.

7. The method of claim 4, wherein the audio alerts include an audible message recommending to the user at least one selected from the group consisting of: a predetermined tonal change to match the actual perceived cognitive state of the user's voice to the target perceived cognitive state of the user's voice; and a predetermined vocabulary change to match the actual perceived cognitive state of the user's voice to the target perceived cognitive state of the user's voice.

8. The method of claim 4, wherein the haptic alert comprises vibrating an alert device at a rate of vibration which increases as the difference increases between the actual perceived cognitive state of the user's voice and the target perceived cognitive state of the user's voice.

9. The method of claim 1, wherein the user is robot.

10. The method of claim 1, wherein the target perceived cognitive state of the user's voice is at least one selected from a group consisting of: empathy; strength; enthusiasm; excitement; sadness; anger; happiness; irritation; pacification; and enticement.

11. A computer program product, the computer program product comprising a non-transitory computer readable storage medium having program instructions embodied therewith, the program instructions executable by a computing device to cause the computing device to:

receive user input defining a target perceived cognitive state of a user's voice;

determine an actual perceived cognitive state of the user's voice based on cognitively analyzing a spoken sample of the user's voice;

select a tonal change to achieve the target perceived cognitive state of the user's voice based on the actual perceived cognitive state of the user's voice differing from the target perceived cognitive state of the user's voice;

output a recommendation to the user to achieve the targeted perceived cognitive state by making the selected tonal change to the user's voice; and display a color coded visual message to the user to adjust a tone of the user's voice, a volume of the user's voice, a speed of the user's voice, an inflection of the user's voice and a vocabulary of the user's voice to achieve the targeted perceived cognitive state while speaking, wherein a color of the color coded visual message represents an amount of deviation from the target perceived cognitive state of the user's voice.

12. The computer program product of claim 11, wherein the program instructions further include program instructions executable by the computing device to:

generate a modified voice by modifying the tone of the user's voice to match the actual perceived cognitive state of the user's voice to the target perceived cognitive state of the user's voice; and output the modified voice via a speaker device.

13. The computer program product of claim 12, wherein modifying the tone includes at least one selected from a group consisting of: changing the volume of the user's voice; changing the inflection of the user's voice; and changing the speed of the user's voice.

14. The computer program product of claim 11, wherein the program instructions are executable by the computing device to cause the computing device to generate an alert that is at least one selected from the group consisting of; a visual alert; an audio alert; and haptic alert.

15. A system comprising:

a processor, a computer readable memory, and a computer readable storage medium;

program instructions to receive user input defining a target perceived cognitive state of a user's voice;

program instructions to determine an actual perceived cognitive state of the user's voice based on cognitively analyzing a spoken sample of the user's voice;

program instructions to provide an alert in real time to the user based on the actual perceived cognitive state of the user's voice differing from the target perceived cognitive state of the user's voice;

program instructions to output a recommendation to the user to achieve the targeted perceived cognitive state, wherein the outputting the recommendation is performed based on determining the actual perceived cognitive state of the user's voice differs from the target perceived cognitive state of the user's voice, and wherein the recommendation comprises a recommended tonal change of the user's voice and a recommended vocabulary change of the user's voice; and program instructions to display a color coded visual message including a plurality of bars to the user to adjust a tone of the user's voice, a volume of the user's voice, a speed of the user's voice, an inflection of the user's voice and a vocabulary of the user's voice to achieve the targeted perceived cognitive state while speaking, wherein a color of each bar represents an amount of deviation from the target perceived cognitive state of the user's voice, wherein the program instructions are stored on the computer readable storage medium for execution by the processor via the computer readable memory.

16. The system of claim 15, further comprising program instructions to:

generate a modified voice by modifying the tone of the user's voice to match the actual perceived cognitive state of the user's voice to the target perceived cognitive state of the user's voice; and output the modified voice via a speaker device.

17. The system of claim 16, wherein modifying the tone includes at least one selected from a group consisting of: changing the volume of the user's voice; changing the inflection of the user's voice; and changing the speed of the user's voice.

18. The computer program product of claim 14, wherein the alert is a haptic alert which comprises vibrating an alert device at a rate of vibration which increases as the difference increases between the actual perceived cognitive state of the user's voice and the target perceived cognitive state of the user's voice.

19. The system of claim 15, wherein the alert is a haptic alert which comprises vibrating an alert device at a rate of vibration which increases as the difference increases between the actual perceived cognitive state of the user's voice and the target perceived cognitive state of the user's voice.

20. The method of claim 1, wherein:
the alert includes an audio alert and a haptic alert,
the audio alert is provided by a speaker device and includes an audible message, using the speaker device, recommending to the user at least one selected from the group consisting of: a predetermined tonal change to match the actual perceived cognitive state of the user's voice to the target perceived cognitive state of the user's voice; and a predetermined vocabulary change to match the actual perceived cognitive state of the user's voice to the target perceived cognitive state of the user's voice, and
the haptic alert comprises vibrating an alert device at a rate of vibration which increases as the difference increases between the actual perceived cognitive state of the user's voice and the target perceived cognitive state of the user's voice,
wherein the recommending of a predetermined tonal change includes recommending modifying a tone of the user's voice by selecting from a group consisting of: changing volume of the user's voice; changing inflection of the user's voice; and changing speed of the user's voice, and the color of the color coded visual message is red in response to the amount of deviation from the target perceived cognitive state of the user's voice.

\* \* \* \* \*